United States Patent [19]
Schirmer et al.

[11] 3,955,361
[45] May 11, 1976

[54] GAS TURBINE COMBUSTOR WITH CONTROLLED FUEL MIXING

[75] Inventors: Robert M. Schirmer; Ellsworth H. Fromm, both of Bartlesville, Okla.

[73] Assignee: Phillips Petroleum Company, Bartlesville, Okla.

[22] Filed: Apr. 11, 1974

[21] Appl. No.: 460,040

Related U.S. Application Data
[62] Division of Ser. No. 208,137, Dec. 15, 1971, Pat. No. 3,820,320.

[52] U.S. Cl................................ 60/39.65; 60/39.71; 60/39.74 R; 431/352
[51] Int. Cl.²...................... F02G 3/00; F02C 7/22
[58] Field of Search............. 60/39.74, 39.71, 39.65; 239/403, 404, 405, 406

[56] References Cited
UNITED STATES PATENTS

| | | | |
|---|---|---|---|
| 2,828,609 | 4/1958 | Ogilvie | 60/39.74 R |
| 2,958,194 | 11/1960 | Bayley | 60/39.66 X |
| 3,067,582 | 12/1962 | Schirmer | 60/39.74 B |
| 3,691,762 | 9/1972 | Ryberg et al. | 60/39.65 X |
| 3,703,259 | 11/1972 | Sturgess et al. | 60/39.74 B |
| 3,706,203 | 12/1972 | Goldberg et al. | 60/39.65 |
| 3,736,747 | 6/1973 | Warren | 60/DIG. 11 |

*Primary Examiner*—Carlton R. Croyle
*Assistant Examiner*—Thomas I. Ross

[57] ABSTRACT

New combustors, and methods of operating same, which produce lower emissions, particularly lower emissions of nitrogen oxides.

19 Claims, 10 Drawing Figures

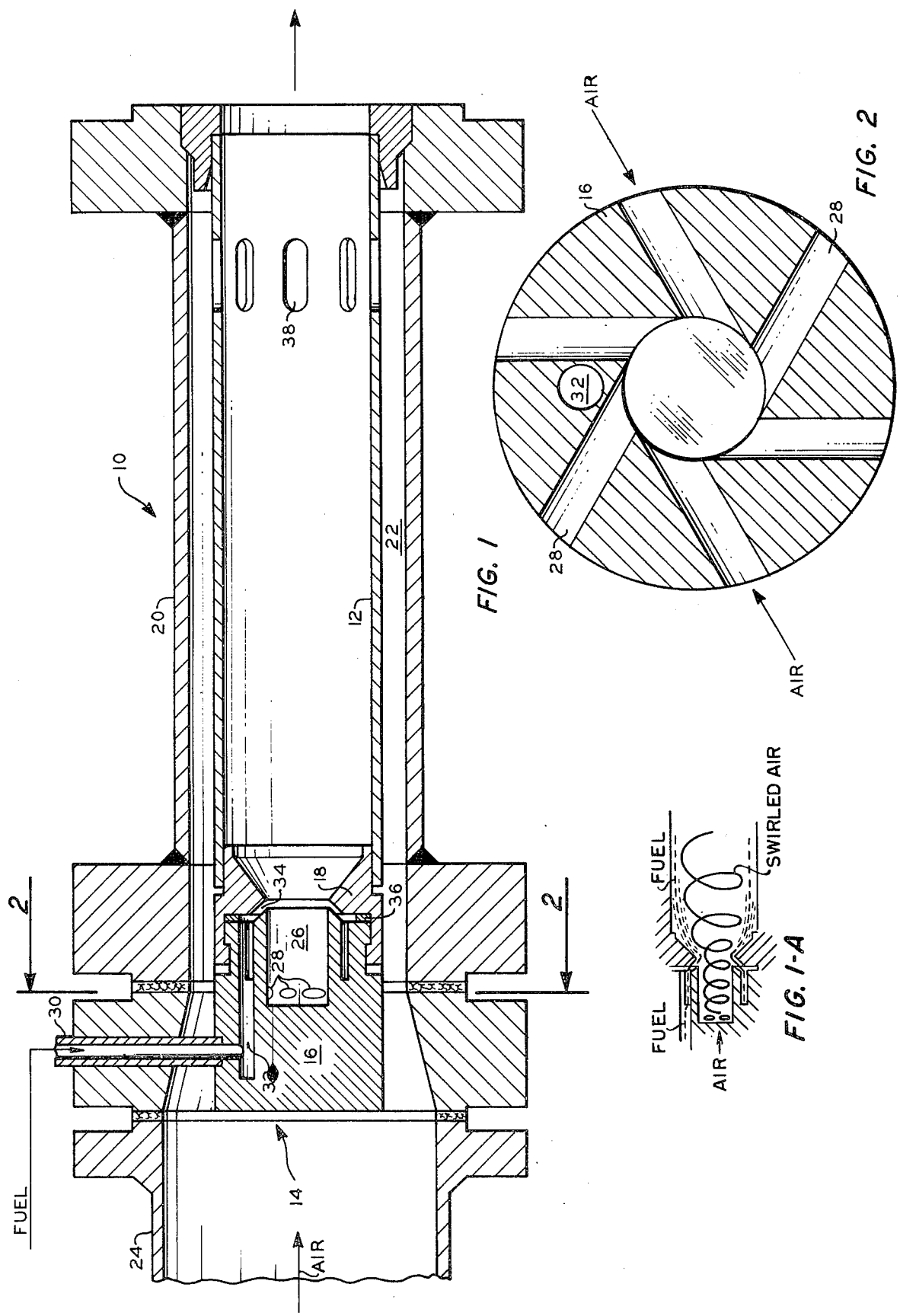

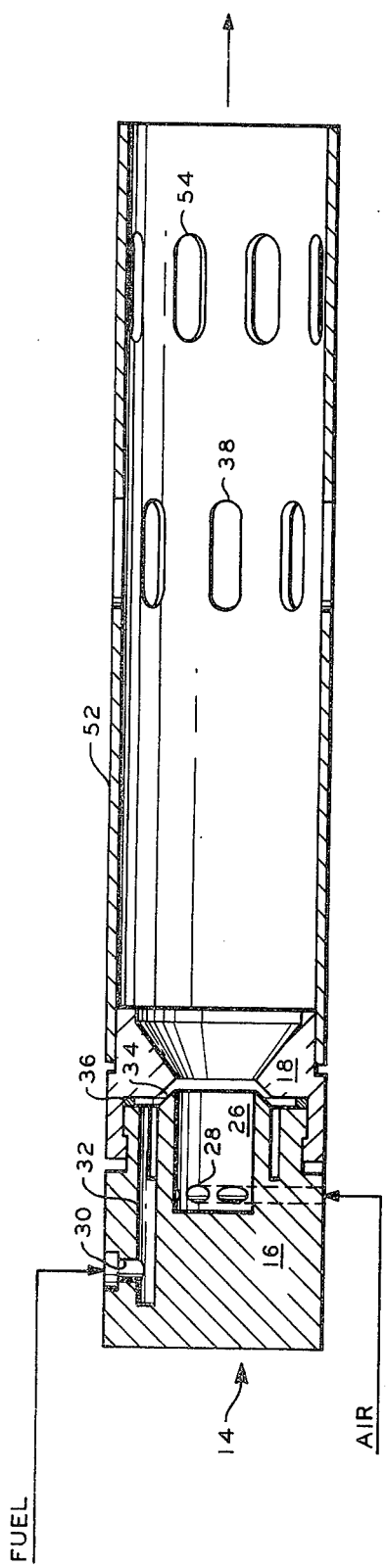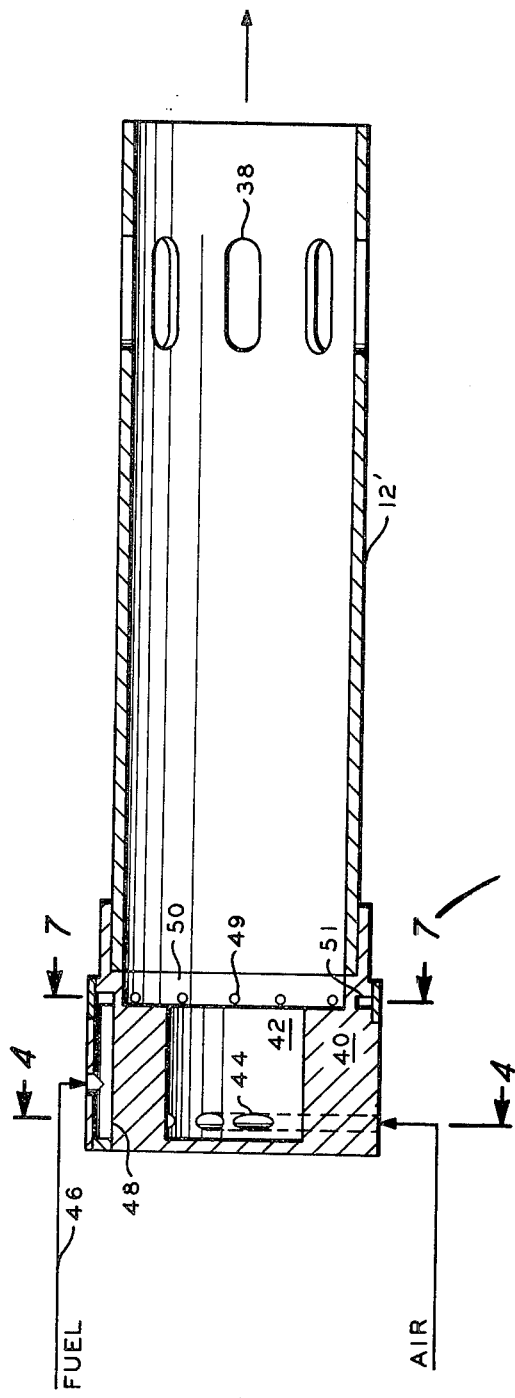

GAS TURBINE COMBUSTOR WITH CONTROLLED FUEL MIXING

This application is a division of copending application Ser. No. 208,137, filed Dec. 15, 1971, now U.S. Pat. No. 3,820,320 issued June 28, 1974.

This invention relates to improved gas turbine combustors and methods of operating same.

Air pollution has become a major problem in the United States and other highly industrialized countries of the world. Consequently, the control and/or reduction of said pollution has become the object of major research and development effort by both governmental and nongovernmental agencies. Combustion of fossil fuel is a primary source of said pollution. It has been alleged, and there is supporting evidence, that automobiles employing conventional piston-type engines are a major contributor to said pollution. Vehicle emission standards have been set by the United States Environmental Protection Agency which are sufficiently restrictive to cause automobile manufacturers to consider employing alternate engines instead of the conventional piston engine.

The gas turbine engine is being given serious consideration as an alternate engine. However, insofar as we presently know, there is no published information disclosing realistic and/or practical combustors which can be operated at conditions typical of those existing in high performance engines, and which will have emission levels meeting or reasonably approaching the standards set by said United States Environmental Protection Agency. This is particularly true with respect to nitrogen oxides emissions.

Thus, there is a need for a combustor of practical and/or realistic design which can be operated in a manner such that the emissions therefrom will meet said standards. Even a practical combustor giving reduced emissions (compared to the combustors of the prior art) approaching said standards would be a great advance in the art. Such a combustor would have great potential value because it is possible the presently very restrictive standards may be relaxed.

The present invention solves the above-described problems by providing improved combustors, and methods of operating same, which produce emissions meeting or reasonably approaching the present stringent standards established by said Environmental Protection Agency.

Thus, according to the invention, there is provided a combustor comprising, in combination: a flame tube; air inlet means for introducing a swirling stream of air into the upstream end portion of said flame tube; and fuel inlet means for introducing a stream of fuel into said flame tube in a direction which is from tangent to less than perpendicular, but non-parallel, to the periphery of said stream of air.

Further according to the invention, there is provided a method for reducing the amount of nitrogen oxides formed in the combustion of a fuel in a cumbustor, which method comprises: introducing a swirling stream of air into the upstream end portion of a combustion zone as the sole stream of primary air introduced into said combustion zone; forming and introducing an annular stratum of said fuel around said stream of air by introducing said fuel in a direction toward and which is tangential, but non-parallel, to the periphery of said stream of air so as to effect controlled mixing of said fuel and air at the interface therebetween to produce an annular fuel-air mixture; passing said fuel-air mixture into said combustion zone as the sole fuel and air supplied to the upstream portion of said combustion zone; and burning said fuel.

FIG. 1 is a view in cross section of a combustor in accordance with the invention.

FIG. 1-A is a schematic representation of fuel and air introduction in accordance with the invention.

FIG. 2 is a cross section taken along the line 2—2 of FIG. 1.

FIGS. 3, 5, and 6 are views in cross section of the flame tube portion of other combustors in accordance with the invention. The outer housing or casing and other elements of these combustors is substantially like that shown in FIG. 1.

Figure 4:
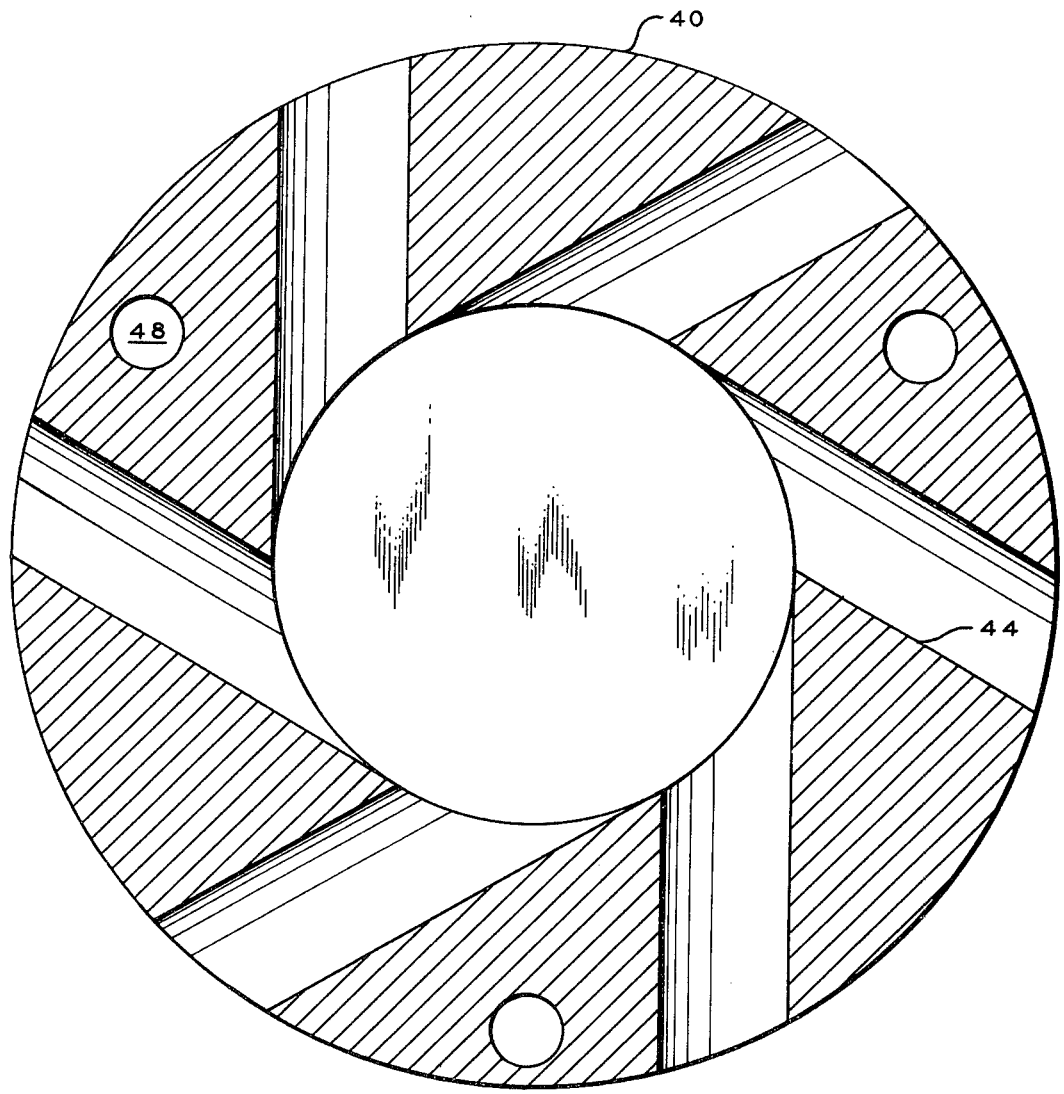
FIG. 4 is a view in cross section taken along the lines 4—4 of FIG. 3.

Referring now to the drawings wherein like reference numerals are employed to denote like elements, the invention will be more fully explained. In FIG. 1 there is illustrated a combustor in accordance with the invention, denoted generally by the reference numeral 10, which comprises a flame tube 12. Said flame tube 12 is open at its downstream end, as shown, for communication with a conduit leading to a turbine or other utilization of the combustion gases. A closure member, designated generally by the reference numeral 14, is provided for closing the upstream end of said flame tube. Said closure member can be fabricated integrally, i.e., as one element, if desired. However, it is presently preferred to fabricate said closure member 14 as two or more elements, e.g., an upstream element 16 and a downstream element 18. An outer casing 20 is disposed concentrically around said flame tube 12 and said closure member 14, and spaced apart therefrom to form an annular chamber 22 around said flame tube and said closure member. Said annular chamber 22 is closed at its downstream end by any suitable means such as that illustrated. Suitable flange members, as illustrated, are provided at the downstream end of said flame tube 12 and outer housing 20 for mounting same and connecting same to a conduit leading to a turbine or other utilization of the combustion gases from the combustor. Similarly, suitable flange members are provided at the upstream end of said flame tube 12 and said outer housing 20 for mounting same and connecting same to a conduit 24 which leads from a compressor or other source of air. While not shown in the drawing, it will be understood that suitable support members are employed for supporting said flame tube 12 and said closure member 14 in the outer housing 20 and said upstream end flange members. Said supporting members have been omitted so as to simplify the drawing.

A generally cylindrical swirl chamber 26 is formed in said upstream element 16 of closure member 14. The downstream end of said swirl chamber 26 is in open communication with the upstream end of said flame tube 12. A first air inlet means is provided for introducing a swirling mass of air into the upstream end portion of said swirl chamber 26 and then into the upstream end of said flame tuabe. As illustrated in FIGS. 1 and 2, said air inlet means comprises a plurality of air conduits 28 extending into said swirl chamber 26 tangentially with respect to the inner wall thereof. Said conduits 28 extend from said annular chamber 22 into said swirl chamber 26.

A fuel inlet means is provided for introducing a stream of fuel in a direction which is from tangent to less than perpendicular, but nonparallel, to the periphery of said stream of air. As illustrated in FIGS. 1 and 2, said fuel inlet means comprises a fuel conduit 30 leading from a source of fuel, communicating with a passageway 32, which in turn communicates with fuel passageway 34 which is formed by an inner wall of said downstream element 18 of closure member 14 and the downstream end wall of said upstream element 16 of closure member 14. It will be noted that the inner wall of said downstream element is spaced apart from and is complementary in shape to the downstream end wall of said upstream element 16. The direction of the exit portion of said fuel passageway 34 can be varied over a range which is intermediate or between tangent and perpendicular, but non-parallel, to the periphery of the stream of air exiting from swirl chamber 26. Varying the direction of the exit portion of fuel passageway 34 provides one means or method for controlling the degree of mixing between the fuel stream and said air stream at the interface therebetween. As illustrated in FIG. 1, the direction of the exit portion of fuel passageway 34 forms an angle of approximately 45 degrees with respect to the periphery of the air exiting from swirl chamber 26. Generally speaking, in most instances, it will be desired that the exit portion of said fuel passageway 34 has a direction which forms an angle within the range of from about 15 to about 75, preferably about 30 to about 60, degrees with respect to the periphery of the stream of air exiting from swirl chamber 26. In most instances, it will be preferred that the fuel from fuel passageway 34 be introduced in a generally downstream direction. However, it is within the scope of the invention to introduce said fuel in an upstream direction. Shim 36 provides means for varying the width of said fuel passageway 34. Any other suitable means, such as threads provided on the walls of upstream element 16 and downstream element 18, can be provided for varying the width of said fuel passageway 34. As will be understood by those skilled in the art in view of this disclosure, the shape of the upstream inner wall of said downstream element 18 and the shape of the downstream end wall of said upstream element 16 can be changed, but maintained complementary with respect to each other, so as to accommodate the above-described changes in direction and width of said fuel passageway 34.

A plurality of openings 38 is provided at a first station in the downstream portion of said flame tube 12 for admitting a second stream of air into said flame tube from said annular chamber 22. In the combustor of the invention illustrated in FIG. 1, said second stream of air will principally comprise quench air for quenching the combustion products before passing same on to the turbine.

Figure 7:
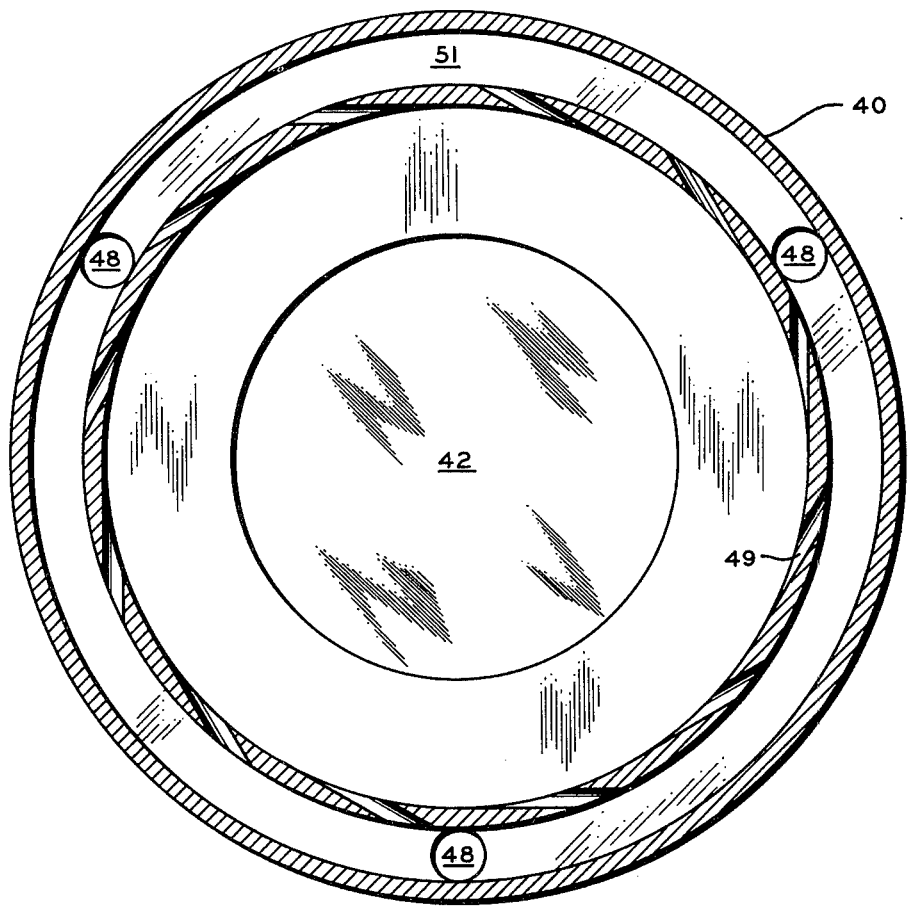
FIG. 7 is a cross section along the line 7—7 of FIG. 3.

Referring now to FIG. 3, there is illustrated the flame tube portion and closure member therefor of another combustor in accordance with the invention. It will be understood that the complete combustor will comprise an outer housing or casing 20 and suitable flange members substantially as illustrated in FIG. 1. The flame tube 12' of the combustor of FIG. 3 is substantially like flame tube 12 of FIG. 1. A closure member 40 is mounted on the upstream end of said flame tube 12' in any suitable manner so as to close the upstream end of said flame tube except for the openings provided in said closure member. A generally cylindrical swirl chamber 42 is formed in said closure member 40. The downstream end of said swirl chamber is in open communication with the upstream end of said flame tube. An air inlet means is provided for introducing a swirling mass of air into the upstream end portion of said swirl chamber 42 and then into the upstream end of said flame tube 12'. As illustrated in FIGS. 3 and 4, said air inlet means comprises a plurality of air conduits 44 extending into said swirl chamber 42 tangentially with respect to the inner wall thereof. Said conduits 44 extend from an annular space 22, similarly as in FIG. 1. The fuel inlet means in the combustor of FIG. 3 comprises a fuel supply conduit 46 which is in communication with three fuel passageways 48, which in turn is in communication with an annular fuel passageway 51 formed in the downstream end portion of said closure member 40. A plurality of fuel conduits 49 extend from said passageway 51 into a recess 50, also formed in the downstream end portion of said closure member, tangentially with respect to the inner wall of said recess. As illustrated in FIGS. 3 and 4, said air inlet conduits 44 are adapted to introduce air tangentially into swirl chamber 42 in a clockwise direction (when looking downstream), said fuel inlet conduits 49 in FIG. 7 are adapted to introduce fuel tangentially into said recess 50 in a counterclockwise direction. This is a presently preferred arrangement in one embodiment of the invention. However, it is within the scope of the invention to reverse the directions of said air inlet conduits 44 and said fuel inlet conduits 49, or to have the directions of both said air inlet conduits and said fuel inlet conduits the same, e.g., both clockwise or both counterclockwise.

Referring now to FIG. 5, there is illustrated the flame tube portion and closure member therefor of another combustor in accordance with the invention. The flame tube 52 of the combustor illustrated in FIG. 5 is substantially like flame tube 12 in FIG. 1 except that the series of air inlet openings 38 has been moved in an upstream direction and a second plurality of openings 54 has been provided at a second station in the downstream portion of said flame tube 52, spaced apart from and downstream from said first plurality of openings 38, for admitting a second stream of air into the interior of said flame tube from an annular chamber 22 like that shown in FIG. 1 when an outer housing or casing is provided around said flame tube. Closure member 14 for flame tube 52 is like closure member 14 in FIG. 1.

Figure 6:
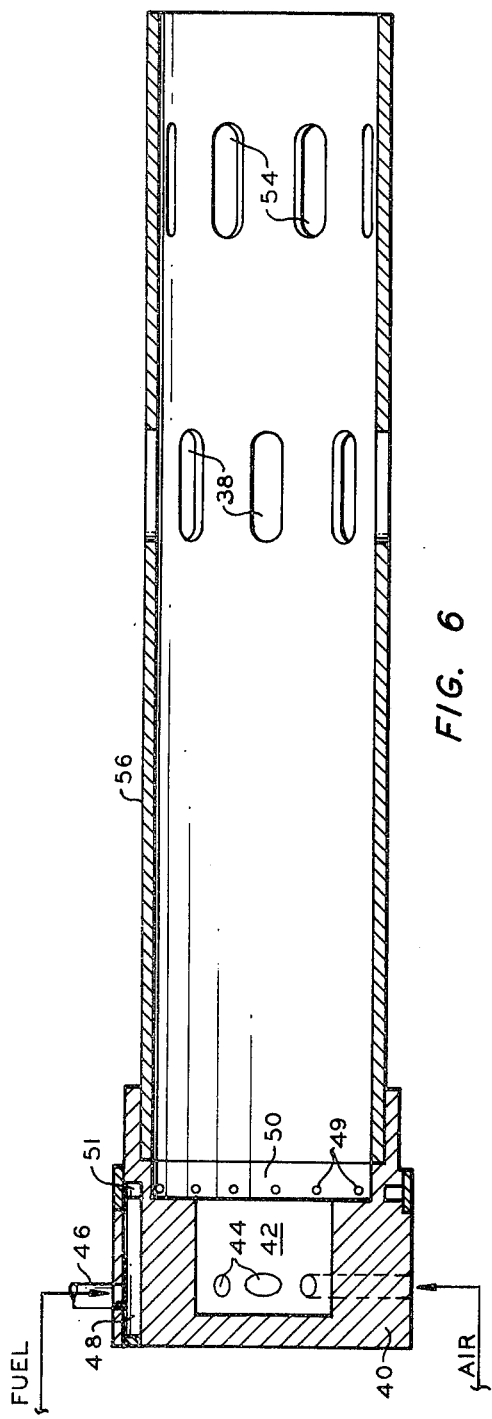

Referring now to FIG. 6, there is illustrated the flame tube portion and closure member therefor of another combustor in accordance with the invention. The flame tube 56 of the combustor of FIG. 6 is like flame tube 12' of FIG. 3 except that said flame tube 56 has been lengthened and a second plurality of openings 54 has been provided at a second station in the downstream portion of said flame tube, downstream from and spaced apart from said first plurality of openings 38, for admitting a second stream of air into the interior of said flame tube 56 from an annular space like annular space 22 when an outer housing or casing is provided around said flame tube, as in FIG. 1. Closure member 40 in FIG. 6 is like closure member 40 in FIG. 3.

Figure 8:
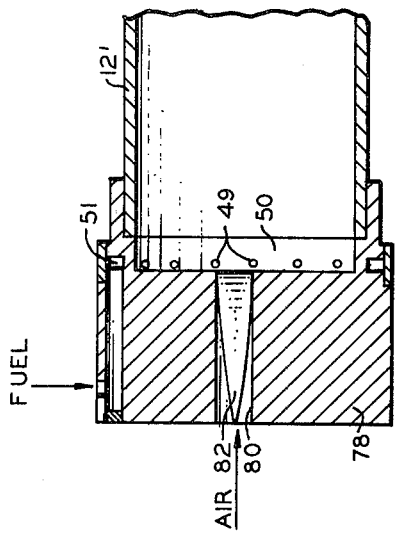
FIGS. 8 and 9 are views in cross section of other closure members or dome members which can be employed with the flame tubes of the combustors described herein.
Figure 9:
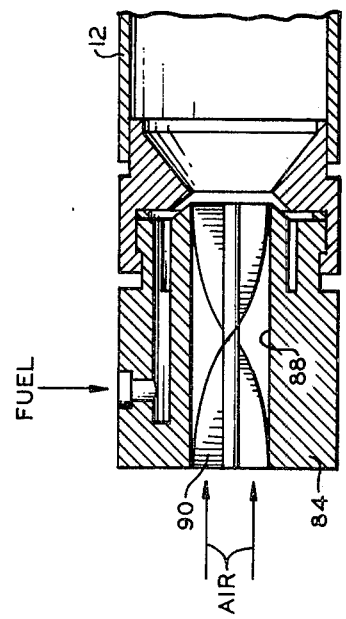

Referring now to FIGS. 8 and 9, there are illustrated other types of closure members which can be employed with the flame tubes of the combustors described above. In FIG. 8 closure member 78 is similar to closure member 40 of FIG. 3. The principal difference is that in closure member 78 a conduit means 80 is provided which extends through said closure member 78 into communication with the upstream end portion of flame tube 12, for example. At least one swirl vane 82 is positioned in said conduit means 80 for imparting a swirling motion to the air passing through said conduit means 80. In FIG. 9, closure member 84 is similar to closure member 14 of FIG. 1. The principal difference is that in closure member 84 an annular conduit means 88 is provided which extends through the body of said closure member 84 into open communication with the upstream end of the flame tube 12, for example. At least one swirl vane 90 is provided in said conduit means 88 for imparting a swirling motion to the air passing through said conduit 88.

In the drawings certain closure members have been employed with certain flame tubes. However, it will be understood that the combustors of the invention are not limited to the particular combinations illustrated. It is within the scope of the invention to employ any of the above described closure members with any of the above described flame tubes.

In one presently preferred method of operating the combustor of FIG. 1, a stream of air from a compressor (not shown) is passed via conduit 24 into annular space 22. A portion of said air then passes through tangential conduits 28 into swirl chamber 26. Said tangential conduits 28 impart a helical or swirling motion to the air entering said swirl chamber and exiting therefrom. This swirling motion creates a strong vortex action resulting in a reverse circulation of hot gases within flame tube 12 upstream toward said swirl chamber 26 during operation of the combustor.

A stream of fuel, preferably prevaporized, is admitted via conduit 30, passageway 32, and fuel passageway 34. Fuel exiting from fuel passageway 34 is formed into an annular stratum around the swirling stream of air exiting from swirl chamber 26. This method of introducing fuel and air effects a controlled mixing of said fuel and air at the interface therebetween. Initial contact of said fuel and air occurs upon the exit of said air from said swirl chamber 26. Immediately after said initial contact the fuel and air streams (partially mixed at said interface) are expanded, in a uniform and graduated manner during passage of said fuel and air through the flared portion of member 18, from the volume thereof in the region of said initial contact to the volume of said combustion chamber at a point in said flame tube downstream from said initial contact. Said expansion of fuel and air thus takes place during at least a portion of the mixing of said fuel and said air. The resulting mixture of fuel and air is burned and combustion gases exit the downstream end of flame tube 12. A second stream of air, comprising quench air principally, is admitted to the interior of flame tube 12 from annular space 22 via inlet openings 38 in the downstream portion of said flame tube.

In one presently preferred method of operating the combustor of FIG. 3, the method of operation is similar to that described above for the combustor of FIG. 1. A stream of air is admitted to swirl chamber 42 via tangential inlet conduits 44 which impart a helical or swirling motion to said air. A stream of fuel, preferably prevaporized, is admitted via conduit 46, fuel passageways 48, and tangential fuel conduits 49 into recess 50 formed at the downstream end of said closure member 40. Said fuel is thus formed into an annular stratum around the swirling stream of air exiting from swirl chamber 42. This method of introducing fuel and air also effects controlled mixing of said fuel and air at the interface therebetween.

In one presently preferred method of operating the combustor of FIG. 5, the operation is similar to that described above for the combustor of FIG. 1. A principal difference is that in addition to the stream of air admitted from annular space 22 via openings 38 into the interior of flame tube 52, another stream of air is admitted to the interior of said flame tube via openings 54. The amounts of the various streams of air admitted through tangential openings 28, openings 38, and openings 54 can be controlled by varying and/or correlating the size of said openings relative to each other as described further hereinafter in connection with the examples.

The method of operation of the combustor of FIG. 6 is substantially like that described above for FIG. 5, taking into consideration that closure member 40 in FIG. 6 is like closure member 40 in FIG. 3.

The following examples will serve to further illustrate the invention.

EXAMPLES

A series of test runs was made employing combustors of the invention described herein, and a typical "standard" or prior art combustor as a control combustor. The same fuel was used in all of said test runs. Properties of said fuel are set forth in Table I below. Design details of the combustors of the invention are set forth in Table II below. Said design details, e.g., dimensions, are given by way of illustration only and are not to be construed as limiting the invention. Said dimensions can be varied within wide limits so long as the improved results of the invention are obtained. For example, the formation of nitrogen oxides in a combustion zone is an equilibrium reaction. Thus, in designing a combustion zone, attention should be given to the size thereof so as to avoid unduly increasing the residence time therein. It is desirable that said residence time not be long enough to permit the reactions involved in the formation of nitrogen oxides to attain equilibrium. In said Table II the combustors have been identified by a number which is the same as the figure number of which they are illustrated.

Said control combustor basically embodies the principal features of combustors employed in modern aircraft-turbine engines. It is a straight-through can-type combustor employing fuel atomization by a single simplex-type nozzle. The combustor liner was fabricated from 2-inch pipe, with added internal deflector skirts for air film cooling of surfaces exposed to the flame. Exhaust emissions from this combustor, when operated at comparable conditions for combustion, are in general agreement with measurements presently available from several different gas turbine engines. Said control combustor had dimensions generally comparable to the above described combustors of the invention.

Each of said combustors of the invention and said control combustor was run at 12 test points or conditions, i.e., 12 different combinations of inlet-air temperature, combustor pressure, flow velocity, and heat input rate. Test points or conditions 1 to 6 simulate idling conditions, and test points 7 to 12 simulate maximum power conditions. The combustors of the invention were run using prevaporized fuel. The control combustor was run using atomized fuel. Analyses for content of nitrogen oxides (reported as NO), carbon monoxide, and hydrocarbons (reported as carbon) in the combustor exhaust gases were made at each test condition for each combustor. Each pollutant measured is reported in terms of pounds per 1000 pounds of fuel fed to the combustor. The results from test conditions 1 to 6 are set forth in Table III below. The results from test conditions 7 to 12 are set forth in Table IV below.

Table I

| PHYSICAL AND CHEMICAL PROPERTIES OF TEST FUEL | Philjet A-50 |
|---|---|
| ASTM Distillation, F | |
| Initial Boiling Point | 340 |
| 5 vol % evaporated | 359 |
| 10 vol % evaporated | 362 |
| 20 vol % evaporated | 371 |
| 30 vol % evaporated | 376 |
| 40 vol % evaporated | 387 |
| 50 vol % evaporated | 398 |
| 60 vol % evaporated | 409 |

Table I-continued

| PHYSICAL AND CHEMICAL PROPERTIES OF TEST FUEL | Philjet A-50 |
|---|---|
| 70 vol % evaporated | 424 |
| 80 vol % evaporated | 442 |
| 90 vol % evaporated | 461 |
| 95 vol % evaporated | 474 |
| End Point | 496 |
| Residue, vol % | 0.8 |
| Loss, vol % | 0.0 |
| Gravity, degrees API | 46.6 |
| Density, lbs/gal | 6.615 |
| Heat of Combustion, net, Btu/lb | 18,670 |
| Hydrogen Content, wt % | 14.2 |
| Smoke Point, mm | 27.2 |
| Sulfur, wt % | 0.001 |
| Gum, mg/100 ml | 0.0 |
| Composition, vol % | |
| Paraffins | 52.8 |
| Cycloparaffins | 34.5 |
| Olefins | 0.1 |
| Aromatics | 12.6 |
| Formula (calculated) | $(C_{11}H_{22})$ |
| Stoichiometric Fuel/Air Ratio, lb/lb | 0.0676 |

Table II

COMBUSTOR DESIGN

| Variable | Combustor Number | | | |
|---|---|---|---|---|
| | 1 | 3 | 5 | 6 |
| Closure Member (14 or 40) | | | | |
| Air Inlet Diameter, in. | 0.875 | 1.250 | 0.875 | 1.250 |
| Inlet Type | Tangent | Tangent | Tangent | Tangent |
| Hole Diameter, in. | 0.250 | 0.281 | 0.250 | 0.281 |
| Number of Holes | 6 | 6 | 6 | 6 |
| Total Hole Area, sq. in. | 0.295 | 0.373 | 0.295 | 0.373 |
| % Total Combustor Hole Area | 10.554 | 12.983 | 5.571 | 6.942 |
| Fuel Slot, in. | 0.005 | — | 0.005 | — |
| Fuel Tube Diameter, in. | — | 12–0.062 | — | 12–0.062 |
| Exit Type | — | Tangent | — | Tangent |
| Flame Tube | | | | |
| 1st Station (38) | | | | |
| Hole Diameter, in. | 5/16×1* | 5/16×1 | 5/16×1 | 5/16×1 |
| Total Number of Holes | 8 | 8 | 8 | 8 |
| Total Hole Area, sq. in. | 2.500 | 2.500 | 2.500 | 2.500 |
| % Total Combustor Hole Area | 89.446 | 87.017 | 47.214 | 46.528 |
| 2nd Station (54) | | | | |
| Hole Diameter, in. | — | — | 5/16×1 | 5/16×1 |
| Total Number of Holes | — | — | 8 | 8 |
| Total Hole Area, sq. in. | — | — | 2.500 | 2.500 |
| % Total Combustor Hole area | — | — | 47.214 | 46.528 |
| Total Combustor Hole Area, sq. in. | 2.795 | 2.873 | 5.295 | 5.373 |
| Combustor Cross Sect. Area, sq. in. | 3.355 | 3.355 | 3.355 | 3.355 |
| % Cross Sectional Area | 83.293 | 85.616 | 157.777 | 160.101 |
| Combustor Inside Diameter, in. | 2.067 | 2.067 | 2.067 | 2.067 |
| Primary Zone Length, in. | 7.125 | 6.125 | 4.625 | 6.125 |
| Volume, cu. in. | 23.909 | 20.554 | 15.520 | 20.554 |
| Combustor Length, in. | 11.250 | 10.250 | 11.250 | 12.750 |
| Volume, cu. in. | 37.751 | 34.395 | 37.751 | 42.784 |

*Holes are 5/16" diameter at ends; slots are 1" long.

Table III

COMPARISON OF EMISSIONS FROM COMBUSTORS AT IDLE CONDITIONS

| Combustor Operating Variables | | Test Conditions | | | | | |
|---|---|---|---|---|---|---|---|
| | | 1 | 2 | 3 | 4 | 5 | 6 |
| Temperature, Inlet Air, F. | | 900 | 900 | 900 | 900 | 900 | 900 |
| Pressure, in. Hg. abs. | | 50 | 50 | 50 | 50 | 50 | 50 |
| Velocity, Cold Flow, ft/sec. | | 250 | 250 | 250 | 400 | 400 | 400 |
| Heat-Input Rate, Btu/lb Air | | 200 | 275 | 350 | 200 | 275 | 350 |
| NITROGEN OXIDES | | lbs/1000 lbs Fuel | | | | | |
| Combustors | No. | | | | | | |
| Control Combustor | C | 3.4 | 3.4 | 3.2 | 2.2 | 2.1 | 2.3 |
| Combustor | 1 | 0.9 | 0.8 | 0.9 | 0.7 | 0.6 | 0.7 |
| Combustor | 3 | 5.4 | 2.3 | 1.8 | 3.5 | 2.3 | 1.4 |
| Combustor | 5 | 1.3 | 1.6 | 2.2 | 1.0 | 1.2 | 1.2 |
| Combustor | 6 | 2.2 | 1.8 | 2.2 | 1.7 | 1.5 | 1.4 |
| CARBON MONOXIDE | | lbs/1000 lbs Fuel | | | | | |
| Combustors | No. | | | | | | |
| Control Combustor | C | 10.0 | 2.0 | 0.0 | 17.2 | 8.6 | 0.0 |
| Combustor | 1 | 100.2 | | 21.8 | 1.3 | 148.0 | 36.2 | 7.0 |
| Combustor | 3 | 70.2 | 15.2 | 0.8 | 102.6 | 50.2 | 3.8 |

Table III-continued

COMPARISON OF EMISSIONS FROM COMBUSTORS AT IDLE CONDITIONS

| Combustor Operating Variables | | Test Conditions | | | | | |
|---|---|---|---|---|---|---|---|
| | | 1 | 2 | 3 | 4 | 5 | 6 |
| Combustor | 5 | 24.5 | 14.2 | 0.0 | 37.6 | 18.8 | 2.6 |
| Combustor | 6 | 15.9 | 8.9 | 1.3 | 26.6 | 16.2 | 2.6 |
| HYDROCARBONS | | lbs/1000 lbs Fuel | | | | | |
| Combustors | No. | | | | | | |
| Control Combustor | C | 0.6 | 0.7 | 0.4 | 0.9 | 0.4 | 0.8 |
| Combustor | 1 | 0.2 | 0.2 | 0.2 | 0.2 | 0.2 | 0.4 |
| Combustor | 3 | 0.1 | 0.1 | 0.1 | 0.1 | 4.8 | 0.8 |
| Combustor | 5 | 0.6 | 0.1 | 0.1 | 0.2 | 0.1 | 0.0 |
| Combustor | 6 | 0.4 | 0.3 | 0.1 | 0.4 | 1.0 | 0.2 |

Table IV

COMPARISON OF EMISSIONS FROM COMBUSTORS AT MAXIMUM POWER CONDITIONS

| Combustor Operating Variables | | Test Conditions | | | | | |
|---|---|---|---|---|---|---|---|
| | | 7 | 8 | 9 | 10 | 11 | 12 |
| Temperature, Inlet Air, F. | | 1100 | 1100 | 1100 | 1100 | 1100 | 1100 |
| Pressure, in. Hg abs. | | 110 | 110 | 110 | 110 | 110 | 110 |
| Velocity, Cold Flow, ft/sec | | 250 | 250 | 250 | 400 | 400 | 400 |
| Heat-Input Rate, Btu/lb Air | | 150 | 225 | 300 | 150 | 225 | 300 |
| NITROGEN OXIDES | | lbs/1000 lbs Fuel | | | | | |
| Combustors | No. | | | | | | |
| Control Combustor | C | 10.7 | 11.2 | 10.0 | 9.9 | 8.0 | 7.4 |
| Combustor | 1 | 6.6 | 3.4 | 2.4 | 6.7 | 2.0 | 1.9 |
| Combustor | 3 | 26.2 | 10.5 | 4.4 | 21.4 | 8.2 | 3.0 |
| Combustor | 5 | 4.6 | 5.3 | 5.6 | 2.4 | 3.4 | 4.9 |
| Combustor | 6 | 8.4 | 4.7 | 5.2 | 10.2 | 4.2 | 4.4 |
| CARBON MONOXIDE | | lbs/1000 lbs Fuel | | | | | |
| Combustors | No. | | | | | | |
| Control Combustor | C | 0.0 | 0.0 | 0.0 | 0.0 | 0.0 | 0.0 |
| Combustor | 1 | 29.6 | 5.2 | 3.0 | 58.4 | 17.3 | 4.2 |
| Combustor | 3 | 7.2 | 4.8 | 19.0 | 14.4 | 14.0 | 0.0 |
| Combustor | 5 | 8.4 | 4.4 | 0.0 | 15.1 | 4.4 | 0.0 |
| Combustor | 6 | 0.0 | 0.0 | 0.0 | 3.0 | 0.0 | 0.0 |
| HYDROCARBONS | | lbs/1000 lbs Fuel | | | | | |
| Combustors | No. | | | | | | |
| Control Combustor | C | 0.2 | 0.1 | 0.2 | 0.2 | 0.2 | 0.2 |
| Combustor | 1 | 0.2 | 0.2 | 0.2 | 0.3 | 0.2 | 0.1 |
| Combustor | 3 | 0.6 | 0.8 | 1.2 | 1.0 | 0.6 | 0.4 |
| Combustor | 5 | 0.3 | 0.3 | 0.1 | 0.4 | 0.2 | 0.2 |
| Combustor | 6 | 0.3 | 1.0 | 0.3 | 2.2 | 0.2 | 0.2 |

Referring to the above Tables III and Iv, the data there given clearly show that all the combustors of the invention gave results superior to the results obtained with the control combustor. Combustor No. 1 gave outstanding results at substantially all test conditions with respect to nitrogen oxides emissions, the pollutant most difficult to control. Said data also show that all the combustors of the invention can be operated at idle conditions to give not more than about 1.8 pounds of nitrogen oxide emissions per 1000 pounds of fuel burned, and not more than about 5 pounds of nitrogen oxide emission per 1000 pounds of fuel burned at maximum power conditions. Such operating conditions would be preferred operating conditions.

Under some of the test conditions, combustors 1 and 3 tend to give high carbon monoxide emission. This situation was alleviated by combustors 5 and 6 which maintained low levels of nitrogen oxide emissions while reducing the carbon monoxide emissions. It should be noted that this result was obtained by changes which are completely contra to current concepts of combustor design. In the operation of combustors 5 and 6 the total amount of air to the combustor was maintaine constant, e.g., the same as to combustors 1 and 3. Hov ever, the amount of air to the primary combustion zor of combustors 5 and 6 was decreased by increasing th amount of secondary and/or quench air admitted to th downstream portion of the flame tube. This was accon plished by adding the second set of inlet slots 54 dowi stream from the first set of inlet slots 38. This had th effect of enriching the primary combustion zone, whic would increase carbon monoxide emissions from typical prior art combustor.

The operation of said combustors 5 and 6 embodi presently preferred methods in accordance with tl invention. In accordance with said methods the volun of air utilized as primary air is decreased in an amou sufficient to enrich the fuel to air ratio in the prima combustion zone, and the volume of the remaining ¿ which is introduced downstream of the primary coi bustion zone is increased. Said remaining stream of ¿ of increased volume is divided into a first stream coi prising secondary air and a second stream comprisi quench air. Said first stream comprising secondary is introduced into a first region, e.g., slots 38, downstream from the primary combustion zone and said stream comprising quench air is introduced into the flame tube of the combustor at a second region, e.g., slots 54, spaced apart from and downstream from said first region. In practicing said preferred methods of the invention, good results have been obtained when the volume of the stream of primary air is decreased by an amount within the range of from about 25 to about 75 percent by volume of the volume of primary air at which the combustor would normally be operated. The remainder of the air to the combustor is then divided into a stream comprising from about 70 to about 30 volume percent thereof and used as said stream comprising secondary air, and a stream comprising from about 30 to about 70 volume percent of said remaining stream of air and used as said stream comprising quench air.

In the examples, the fuel to the combustors of the invention was prevaporized. However, the invention is not limited to using prevaporized fuels. It is within the scope of the invention to employ atomized liquid fuels. For comparison purposes, all the runs set forth in the above examples were carried out under the conditions of inlet air temperature, combustor pressure, flow velocity, and heat input rate set forth in Tables III and IV. The invention is not limited to the values there given for said variables. It is within the scope of the invention to operate the combustors of the invention under any conditions which give the improved results of the invention. For example, it is within the scope of the invention to operate said combustors at inlet air temperatures within the range of from ambient temperatures or lower to about 1500°F. or higher; at combustor pressures within the range of from about 1 to about 40 atmospheres or higher; at flow velocities within the range of from about 1 to about 500 ft. per second or higher; and at heat input rates within the range of from about 30 to about 1200 BTU per pound of air.

The term "air" is employed generically herein and in the claims, for convenience, to include air and other combustion supporting gases.

While the invention has been described, in some instances, with particular reference to combustors employed in combination with gas turbine engines, the invention is not limited thereto. The combustors of the invention have utility in other application, e.g., boilers.

While certain embodiments of the invention have been described for illustrative purposes, the invention obviously is not limited thereto. Various other modifications will be apparent to those skilled in the air in view of this disclosure. Such modifications are within the spirit and scope of the invention.

We claim:

1. A combustor comprising, in combination:
    a flame tube;
    air inlet means for introducing a swirling stream of air flowing in a downstream direction into the upstream end portion of said flame tube as the sole stream of air introduced into said upstream end portion of said flame tube; and
    fuel inlet means for forming a sole annular stratum of fuel around said stream of air flowing into said flame tube by introducing said fuel in a direction toward and which is from tangential to less than perpendicular, but non-parallel, to the periphery of said stream of air to effect controlled mixing of said fuel and air at the interface therebetween and produce a sole annular fuel-air mixture for introduction into said upstream end portion of said flame tube.

2. A combustor according to claim 1 wherein said fuel inlet means is adapted to introduce said fuel in a direction which is intermediate tangent and perpendicular to the periphery of said stream of air.

3. A combustor according to claim 1, comprising, in further combination, means positioned downstream from said air inlet means and said fuel inlet means for causing uniform and graduated expansion of said air and fuel mixture during entry thereof into said flame tube.

4. A combustor according to claim 1 wherein said air inlet means comprises:
    a swirl chamber disposed at the upstream end of said flame tube, and having a diameter less than the diameter of said flame tube; and conduit means for introducing a swirling mass of air into the upstream end portion of said swirl chamber.

5. A combustor according to claim 4 wherein said conduit means comprises a plurality of air conduits extending into said swirl chamber tangentially with respect to the inner wall thereof.

6. A combustor according to claim 1 wherein:
    a closure member is provided for closing the upstream end of said flame tube; and
    said air inlet means comprises a conduit extending through said closure member into communication with the upstream end portion of said flame tube, and at least one swirl vane positioned in said conduit.

7. A combustor according to claim 6 wherein:
    a recess is formed in the downstream end portion of said closure member; and
    said fuel inlet means comprises a plurality of fuel conduits extending into said recess tangentially with respect to the wall thereof.

8. A combustor according to claim 6 wherein said closure member comprises:
    an upstream element having said conduit formed therein;
    a downstream element having formed therein an expansion passageway which flares outwardly from a point adjacent the downstream end of said conduit to the inner wall of said flame tube;
    an inner wall of said downstream element is spaced apart from and is complementary in shape to the downstream end wall of said upstream element so as to form a fuel passageway between said inner wall of said downstream element and the downstream end wall of said upstream element; and
    said fuel passageway communicates with and forms a part of said fuel inlet means.

9. A combustor according to claim 8, and further comprising means for varying the width of said fuel passageway formed between said upstream and downstream elements of said closure member.

10. A combustor comprising, in combination:
    a flame tube, open at its downstream end;
    a closure member closing the upstream end of said flame tube;
    an outer casing disposed around said flame tube and said closure member and spaced apart therefrom to form an annular chamber around said flame tube and said closure member, said annular chamber being closed at its downstream end;

a generally cylindrical swirl chamber formed in said closure member, the downstream end of said swirl chamber being in open communication with the upstream end of said flame tube;

a first air inlet means for introducing a swirling mass of air into the upstream end portion of said swirl chamber and then into the upstream end of said flame tube as the sole stream of air introduced into said upstream end of said flame tube; and fuel inlet means for forming a sole annular stratum of fuel around said stream of air flowing in a downstream direction from said swirl chamber into said flame tube by introducing said fuel in a direction toward and which is from tangential to less than perpendicular, but non-parallel, to the periphery of said stream of air to effect controlled mixing of said fuel and air at the interface therebetween and produce a sole annular fuel-air mixture, for introduction into said upstream end portion of said flame tube.

11. A combustor according to claim 10 wherein a first plurality of openings is provided in said flame tube downstream from said closure member for admitting a second stream of air into said flame tube from said annular chamber.

12. A combustor according to claim 11 wherein a second plurality of openings is provided in the downstream portion of said flame tube, downstream from said first plurality of openings, for admitting a third stream of air into the interior of said flame tube from said annular chamber.

13. A combustor according to claim 10 wherein the downstream end portion of said closure member comprises an expansion formed therein and which flares outwardly from a point adjacent the downstream end of said swirl chamber to the inner wall of said flame tube.

14. A combustor according to claim 13 wherein said closure member comprises:

an upstream element having said swirl chamber formed therein;

a downstream element having said expansion passageway formed therein;

an inner upstream end wall of said downstream element is spaced apart from and is complementary in shape to the downstream end wall of said upstream element so as to form a fuel passageway between said inner wall of said downstream element and the downstream end wall of said upstream element; and said fuel passageway communicates with and forms a part of said fuel inlet means.

15. A combustor according to claim 14 wherein means are provided for varying the width of said fuel passageway.

16. A combustor according to claim 15 wherein said means for varying the width of said fuel passageway comprises a shim disposed in said passageway.

17. A combustor according to claim 10 wherein said fuel inlet means comprises a plurality of conduits extending tangentially through the downstream end portion of said closure member adjacent the downstream end of said swirl chamber.

18. A combustor according to claim 17 wherein:

said air inlet means comprises a plurality of air conduits extending into said swirl chamber adjacent the upstream end portion thereof and tangentially with respect to the inner wall thereof;

a recess is formed in the downstream end portion of said closure member; and said fuel inlet means comprises a plurality of fuel conduits extending into said recess tangentially with respect to the wall thereof.

19. A combustor according to claim 18 wherein said air conduits extend tangentially into said swirl chamber in one of a clockwise manner and a counterclockwise manner, and said fuel conduits extend tangentially into said recess in the other of clockwise and said counterclockwise manner.

* * * * *